US00RE42578E

(19) United States
(12) Reissued Patent
High et al.

(10) Patent Number: US RE42,578 E
(45) Date of Reissued Patent: Jul. 26, 2011

(54) SYNCHRONIZATION USING COMMITMENT

(75) Inventors: Darrell F. High, Arlington, TX (US); Robert S. Shaw, Cupertino, CA (US)

(73) Assignee: Hewlett-Packard Development Company, L.P., Houston, TX (US)

(21) Appl. No.: 10/788,046

(22) Filed: Feb. 26, 2004

Related U.S. Patent Documents

Reissue of:
(64) Patent No.: 6,601,069
Issued: Jul. 29, 2003
Appl. No.: 09/738,119
Filed: Dec. 15, 2000

(51) Int. Cl.
*G06F 17/00* (2006.01)
(52) U.S. Cl. ..... 707/102; 707/100; 707/101; 707/103 R
(58) Field of Classification Search ..... 707/8, 9, 707/10, 103 R, 200, 201
See application file for complete search history.

(56) References Cited

U.S. PATENT DOCUMENTS 6,064,382 A * 5/2000 Diedrich et al. ..... 715/700
6,088,694 A * 7/2000 Burns et al. ..... 707/8
6,301,601 B1 * 10/2001 Helland et al. ..... 709/101
6,449,627 B1 * 9/2002 Baer et al. ..... 715/514
6,526,416 B1 * 2/2003 Long ..... 707/202
6,970,883 B2 * 11/2005 Ku et al. ..... 707/103 Y

OTHER PUBLICATIONS

Papadopoulos, C.V.; discloses heterogeneity of distributed databases integrating commit protocols; Distributed Computing Systems, 1994., Proceedings of the 14th International Conference; Jun. 21-24, 1994; pp. 380-386.*
Inseon Lee; Yeom, H.Y. discloses a single phase distributed commit protocol for main memory database systems Parallel and Distributed Processing Symposium., Proceedings International, IPDPS 2002, Abstracts and CD-ROM, 2002; pp. 14-21.*

* cited by examiner

*Primary Examiner* — Sana Al-Hashemi

(57) ABSTRACT

A method of sharing a file object among a plurality of competing processes, the file object having a content that at least one competing process may need to adjust so that the file is suitable for the operating environment of the competing process. To help make an adjustment, the file object includes a state attribute that indicates whether or not the file is committed and whether the file is in an inconsistent state. If the file contents are suitable for the specific process and the file object is not committed, the file can be committed by the specific process. If the file contents are not suitable for the specific process and the file object is not committed, the file is locked, set to inconsistent, adjusted, committed by the specific process and then unlocked. This process improves concurrency of the competing processes and reduces message overhead.

23 Claims, 11 Drawing Sheets

New Design When No Modification Needed (First Open)

New Design When No Modification Needed (Additional Opens)

SYNCHRONIZATION USING COMMITMENT

Matter enclosed in heavy brackets [ ] appears in the original patent but forms no part of this reissue specification; matter printed in italics indicates the additions made by reissue.

CROSS-REFERENCE TO RELATED APPLICATIONS

Field of the Invention

The present invention relates generally to a loosely-coupled multi-processor system that shares a commonly-used file, and it more particularly relates to processes that execute on each of the processors of the multi-processor system; the invention reduces the message traffic among the processors needed to achieve a single, consistent image of the commonly-used file.

DESCRIPTION OF THE RELATED ART

FIG. 1 shows a system setting in which the present invention operates. In this figure there are a plurality of processing systems 10, 12, 14, 16, 18, preferably having a similar architecture, connected via a number of point-to-point connections 20, 22, 24, 26, 28, 30. One or more of the processing systems (storage systems) 16, 18 provide storage-related functions for the other processing systems (client systems) 10, 12, 14 and these storage systems 16, 18 arc connected to one or more permanent storage devices 32, 34, 36, 38, such as hard disk drives. Each client system 10, 12, 14 is connected to each of the storage systems 16, 18, preferably using the point-to-point connections 20, 22, 24, 26, 28, 30 and the storage systems themselves are interconnected via a point-to-point connection 40 so that they can serve as a unified, redundant storage system for the client systems. (The storage systems are illustrated as distinct from the set of client processing systems, but the present invention does not depend upon this distinction.)

FIG. 2 shows a diagram of a representative computer system shown in FIG. 1 in which a central processing unit 60, a memory subsystem 62 and an I/O subsystem 64 are preferably interconnected preferably by point-to-point links 66, 68, 70. The representative computer system is connected, via a link 72, to the storage systems via the I/O subsystem. (While these diagrams illustrate point-to-point connections, the current invention is not limited to that topology.) The software on each client system in FIG. 1 includes a number of processes (client processes) 42, 44, 46 that execute on that system and each of these processes typically requires access to the file objects of the storage systems 16, 18. The client processes 42-46 make requests to obtain file objects from the storage systems by sending messages over the point-to-point links to a process called a disk process 48, 50 that executes on each of the storage systems. The disk process 48, 50, upon receipt of the message from a client process 42-46, sends reply messages to the message sender.

File objects, such as executables and library object files, that are requested by the client processes generally contain references that may need to be adjusted when the file object is downloaded on a particular client system so that it properly references other library files, possibly of a different version, on that client system. These references must be written into the contents of the file object and the adjustment must be synchronized with the other client systems so that the file object contents remains consistent. This means that each client process 42-46 that uses the file object must determine whether the contents of a file object are properly adjusted for the process environment that the file object will encounter on the particular client system 10-14. If a file object is currently loaded and in use by any client process, it cannot be changed, but is sharable as long as the other sharing client processes can use the file object with its current adjustments. It is necessary to have a protocol to determine when the current adjustments are appropriate and preserve that state, and to deal with the case in which a client process must adjust the contents of a file object for proper use within its processing environment A protocol for achieving such a modification that is consistent with the processing requirements of processes on the other client systems is shown in FIG. 3 and operates as follows. The client process opens the file object in step 80 and then locks the file object in step 82. This requires that a lock message be sent to the disk process of a storage system that maintains the consistency of the file object. (Once the file object is locked, other processes that attempt to lock the file are delayed until the lock is released.) Next, in step 84, the client process reads the attributes and relevant contents from the file object. If the content of the file is suitable for use, as determined in step 86, the file is unlocked in step 88 and a success indication is returned. If the file object is not properly adjusted (i.e., the content is not suitable), as determined in step 86, for the client system processing environment based on the contents read from the file object and if the file object is not in use as determined in step 90, an adjustment is made in step 92 and the changes are written back to the contents of the file object. The file object is then unlocked in step 88 and a success indication is returned. If the file object is in use, as determined in step 90, the file object is unlocked in step 94 and a failure indication is returned.

FIG. 4 shows a scheduling diagram of the prior art method for synchronization to more clearly illustrate the approximate timing of events at the client system and the storage system, and similar figures are used through out this specification to illustrate different aspects of the present invention. In FIG. 4, the upper line 100 represents an event line for the client system and the lower line or bar 102 represents an event line for the storage system. A line segment 104, 108, 112, 116 directed towards the storage system line indicates a message sent from the client system to the storage system (disk process) and a line segment 106, 110, 114 directed towards the client system represents a message sent from the storage system to the client system. The slope of the directed line segment simply indicates that the message travels at some finite speed between the two systems and the label on the directed line segment indicates the type of message being sent.

The first event 104 depicted in FIG. 4 is the client system transmitting an open request to the disk process of the storage system. This message is received and, in response, the disk process sends an open acknowledge message 106 back to the client system, which then proceeds to make a lock request 108. This message arrives at the disk process which then grants the request 110 to lock the file object. Following the receipt of the lock-granted message 110, a read request 112 is made of the file object by the client system to the storage system, and when the message arrives the storage system returns the file contents 114 that were requested back to the client system. The client system then determines whether the file object is properly adjusted for running in the environment of the client system and, in this example, finds that the file object is properly adjusted and no changes need to be written. Finally, an unlock message 116 is sent to the disk process releasing the file object. As is apparent from the scheduling diagram, the file object stays locked from the time of the lock grant 108 to the time that the unlock request 116 is received and executed at the disk process.

Though the above protocol is effective at maintaining the consistency of the shared file among the competing processes of the client systems, it is expensive in terms of the messages that are required to be sent to and from the disk process. Two messages, a lock and an unlock, are required by each competing process to determine whether the file is in proper condition for use by that process, regardless of whether or not the file contents must be adjusted. The protocol is also expensive in terms of the lack of concurrency that such a process causes to the competing processes because each process must lock the file in order to determine whether an adjustment is required. This does not permit any other process access to the file to determine if the condition of the file is proper for the other processes. If the process cannot obtain the lock because another process has the lock, it must wait for the lock to be released before it can even examine the file.

Therefore, there is a need for an improved protocol that reduces the message traffic to and from the disk process and improves the concurrency among the several client processes.

BRIEF SUMMARY OF THE INVENTION

The present invention is directed towards the above need. It provides a method for sharing among a plurality of competing processes a file object that includes file contents and a state that describes whether the file contents are inconsistent and whether the file object is in the use of a competing process. The state has a value that is either 'uncommitted', 'inconsistent' or 'committed'. The method includes determining the state value of the file object and whether or not the file content is suitable for use by a specific one of the competing processes. If the state value of the file object is not 'committed' and either the state value is 'inconsistent' or the file content is not suitable for use by the specific one of the competing processes, the method then obtains exclusive access to the file object, adjusts the contents of the file object, sets the state of the file object to 'committed', and relinquishes exclusive access to the file object. If the state value of the file object is not 'committed' and the state value is not 'inconsistent' and the file content is suitable for use by the specific one of the competing processes, the method sets the state of the file object to 'committed'. If the state value of the file object is 'committed' and the file content is suitable for use by the specific process, the method shares the committed file; otherwise, the method returns a failure status.

One advantage of the present invention is that the message traffic is greatly reduced from two messages for each check of the shared file to either none or one message in the most common cases. One message is needed if the state value of the file object is 'uncommitted' and its contents are suitable for use. No message is needed is if the state value of the file object is 'committed' and the file content is suitable for shared use by the specific process. Only when the file must be adjusted are more messages required. However, that case occurs rarely.

Another advantage is that the client processes can each operate with a greater degree of concurrency because each of the client processes has access to the shared file without a lock being required in order to determine whether the file contents are suitable for use. In most cases the file is in the proper condition for that client process and needs no adjustment, which means that no locks are required and a process can continue its execution of the shared file without delay.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

Figure 1:
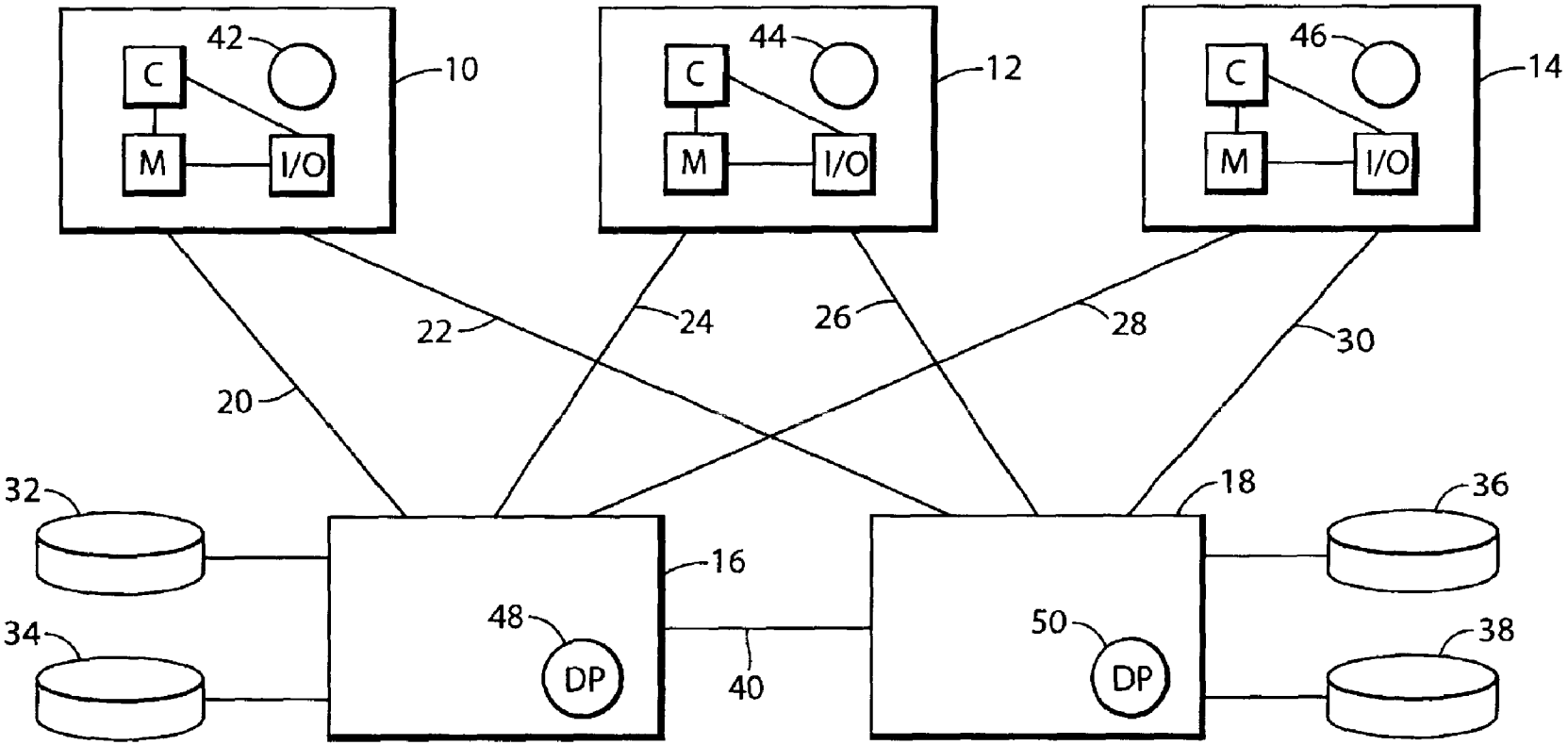
FIG. 1 shows a system setting in which the present invention operates.
Figure 2:
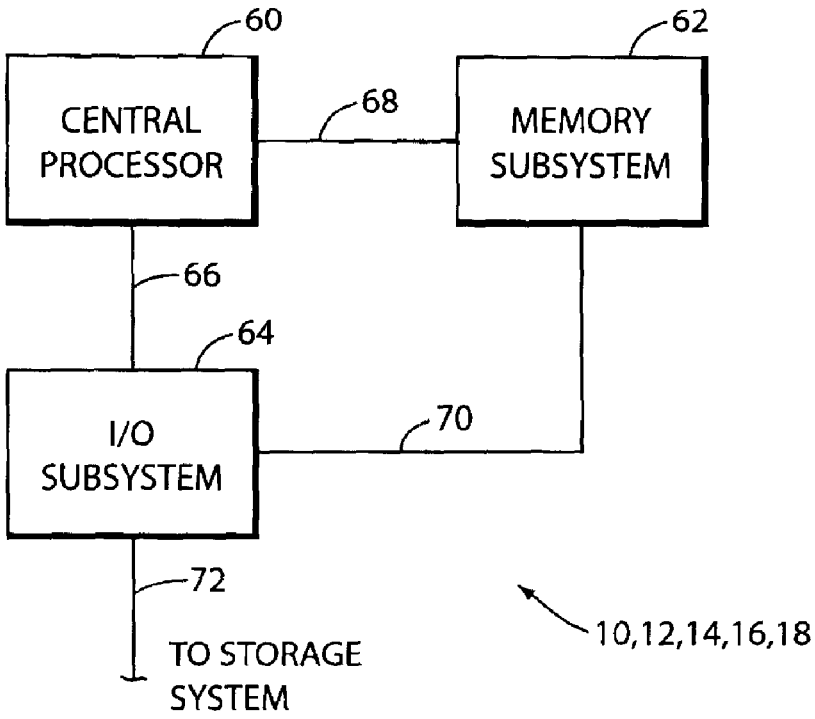
FIG. 2 shows a diagram of a representative computer system shown in FIG. 1.
Figure 4:
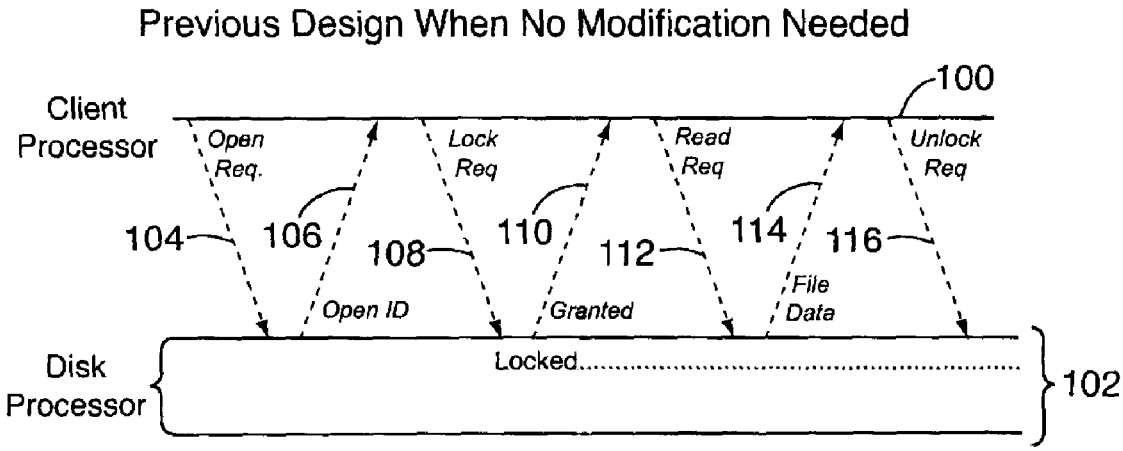
FIG. 4 shows a scheduling diagram of the prior art process for synchronization when no modification of the file is needed.
Figure 3:
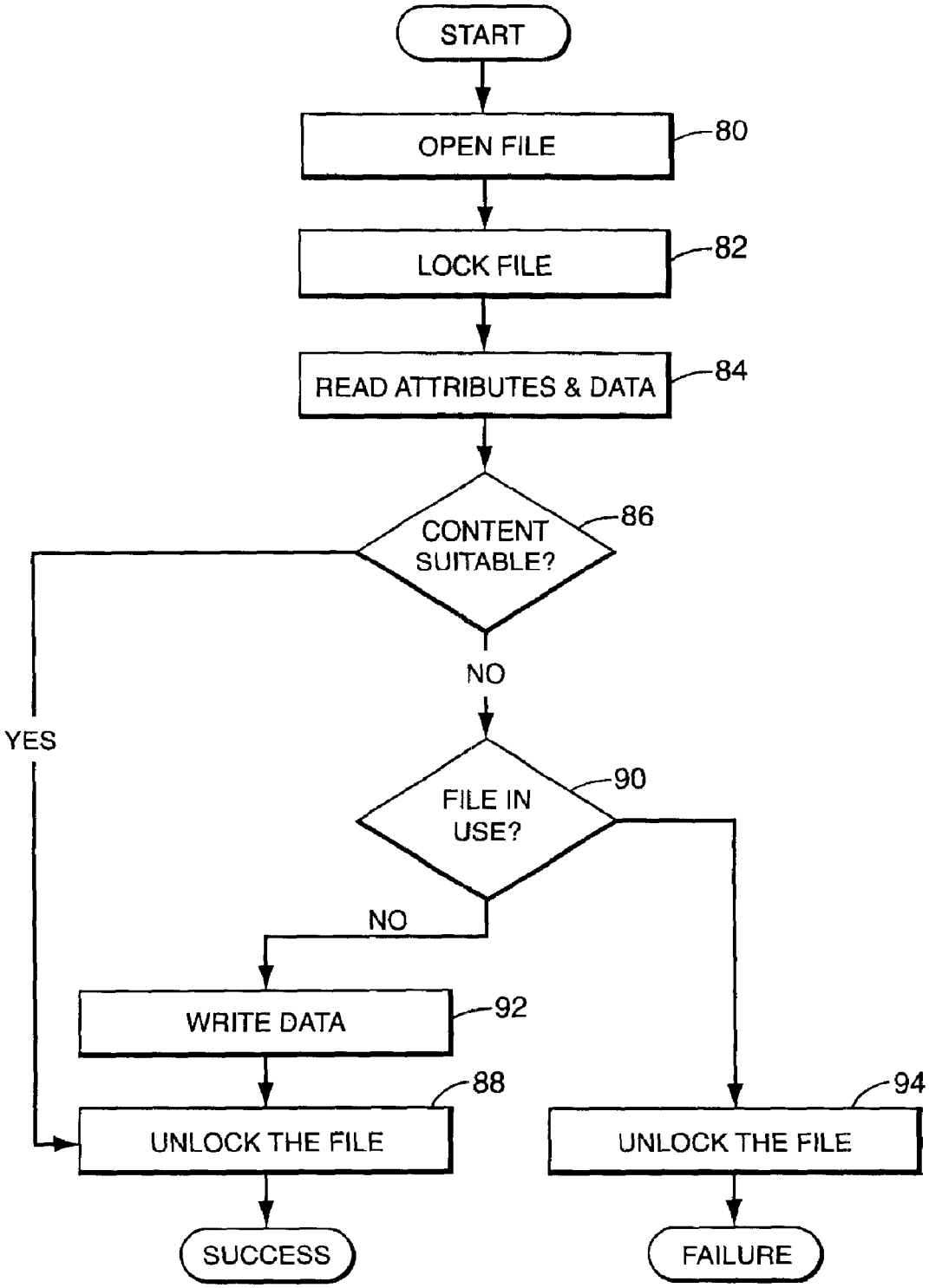
FIG. 3 shows a flow chart of the prior art protocol for synchronization.
Figure 5:
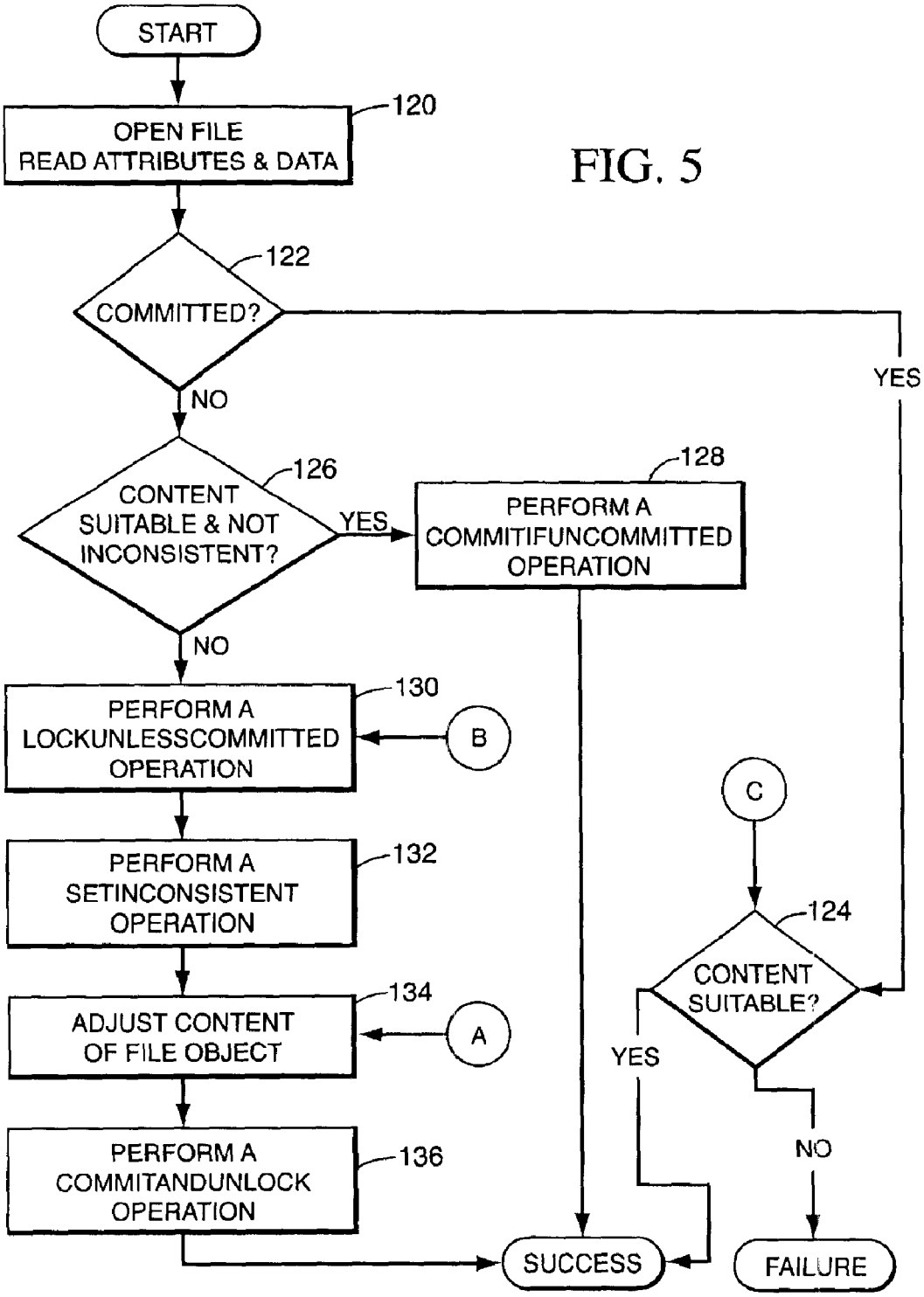
FIG. 5 shows a flow chart of the synchronization protocol of the present invention.

FIG. 5 shows a flow chart of the synchronization protocol of the present invention for each client process. In accordance with and to enable the protocol of FIG. 5, a state attribute is included in each file object. This state attribute can take on three different values, which are 'uncommitted', 'inconsistent', and 'committed'.

The 'uncommitted' state value means that the file object is not in use by any client process. If the file object is undergoing modification, the state is temporarily set to 'inconsistent', which means that the file may have been partially altered. Once the file content has been accepted by a client, the state is set to 'committed'. When no client is using the file object, its state reverts to 'uncommitted'.

Returning to FIG. 5, the following discussion of FIG. 5 applies when there is no change to the state of the state of the file object after that state has been determined in FIG. 5. The cases in which the state of the file object may have changed after the state has been determined by the client process are discussed subsequently in conjunction with the flow charts of FIGS. 6A-6D, which include details not shown in FIG. 5.

In FIG. 5, one of the client processes (hereinafter the specific client process) requests that a file object be opened in step 120 and reads the relevant attributes (state) and contents of the file object, without using a lock in step 120. From this information an assessment is made as to the state of the file object and whether to the contents of the file object need adjustment. There are four cases that the protocol must handle.

In the first case, if the state value of the file object is 'committed', as determined in step 122, and the file contents are in proper form for use by the specific client process as determined in step 124, then a success indication is returned. This means that no adjustment of the file object contents was required and the file object can be shared by the specific client process.

In the second case, if the state value of the file object is 'committed', as determined in step 122, and the file contents are not in proper form for use by the specific client process as determined in step 124, then a failure indication is returned.

In the third case, if the state value of the file object is not 'committed', as determined in step 122, and the state value of the file object is not 'inconsistent' and its contents are suitable for use, as determined in step 126, the specific client process makes an attempt to commit the file. To do this, the client process performs a CommitIfUncommitted operation in step 128. Upon receiving a reply from the disk process that the file object is committed, the flow terminates with a success indication.

In the fourth case, if the state value of the file object is not 'committed', as determined in step 122, and either the state value is 'inconsistent' or the file object's contents are not suitable for use, as determined in step 126, the specific client process attempts to lock the file by performing a LockUnless-Committed operation in step 130. This operation entails sending a LockUnlessCommitted request to the disk process and receiving a reply that an exclusive lock has been granted from the disk process in response to the message. Following this, a SetInconsistent operation is performed in step 132, which sets the state of the file object to 'inconsistent', and the contents of the file object are adjusted in step 134. Finally, a CommitAnd-Unlock operation is performed in step 136. This operation commits the adjusted file and releases the exclusive lock on the file object.

It can be observed that the protocol of the present invention, then, only locks a file object if the file object must be adjusted (the fourth case above). It does not lock the file object to determine whether the contents of the file object are suitable for use by the client process. Therefore, if the most commonly occurring case is that the file object needs no adjustment, then a lock and unlock message to the disk process are saved and only a CommitIfUncommitted message is needed (the third case above). If the file object is already committed, no message is required and two messages are saved (the first and second cases above). Thus, either one or two messages are saved by the protocol of the present invention and the concurrency of each of the competing processes is improved because no lock is required to determine the condition of the shared file.

Figure 6A:
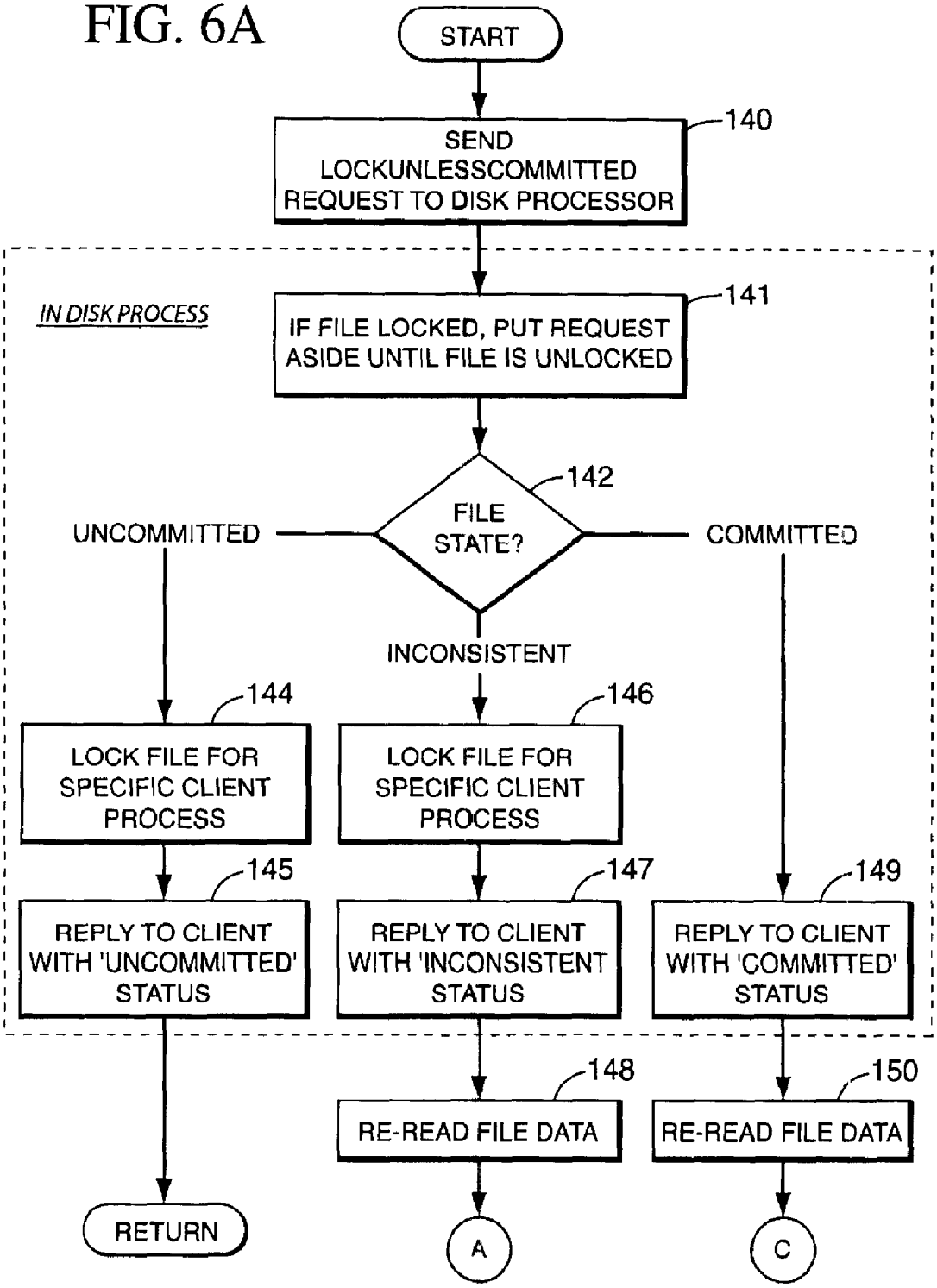
FIG. 6A shows a flow chart of the LockUnlessCommitted operation of the present invention.

FIG. 6A shows a flowchart of the LockUnlessCommitted operation of the present invention. As mentioned above, FIG. 5 depicts the case in which the state value that is determined when the file object is first open and read does not change during the various subsequent steps. However, when there are multiple client processes, operating concurrently, there is a chance that the initially determined state of the file object is altered by a client process other than the specific client process. The LockUnlessCommitted operation at step 130 in FIG. 5 takes this possibility into account, as illustrated in FIG. 6A.

First, in step 140, the client process sends a LockUnless-Committed request to the disk process. In the disk process, at step 141, if the file is locked, the request stays pending until the file is unlocked. The disk process then ascertains, in step 142, the current state of the file object, which can be any one of the three states.

If the state value of the file object is 'uncommitted', the disk process locks the file for the specific client process, in step 144, and replies back to the client process indicating that the file object's state is 'uncommitted,' in step 145. The process then continues at step 132 of FIG. 5.

If the state value of the file object is 'inconsistent', the disk process locks the file for the specific client process, in step 146, and then replies back to the client process indicating that the state value of the file object is 'inconsistent,' in step 147. In response to receiving this reply, the client process re-reads the contents of the file object, in step 148, and the flow continues at A in FIG. 5, at which point the contents of the file object are adjusted to be suitable for the specific client process.

If the state value of the file object is 'committed', the disk process replies back to the client process indicating that the file object's state is 'committed'. This prompts the client process, upon receipt, to re-read the contents of the file object, in step 150. The flow then continues at C in FIG. 5, at which the client process determines whether the content is suitable for that process. If so, it shares the file object and the flow ends successfully. If not, the flow ends with a failure indicated.

Figure 6B:
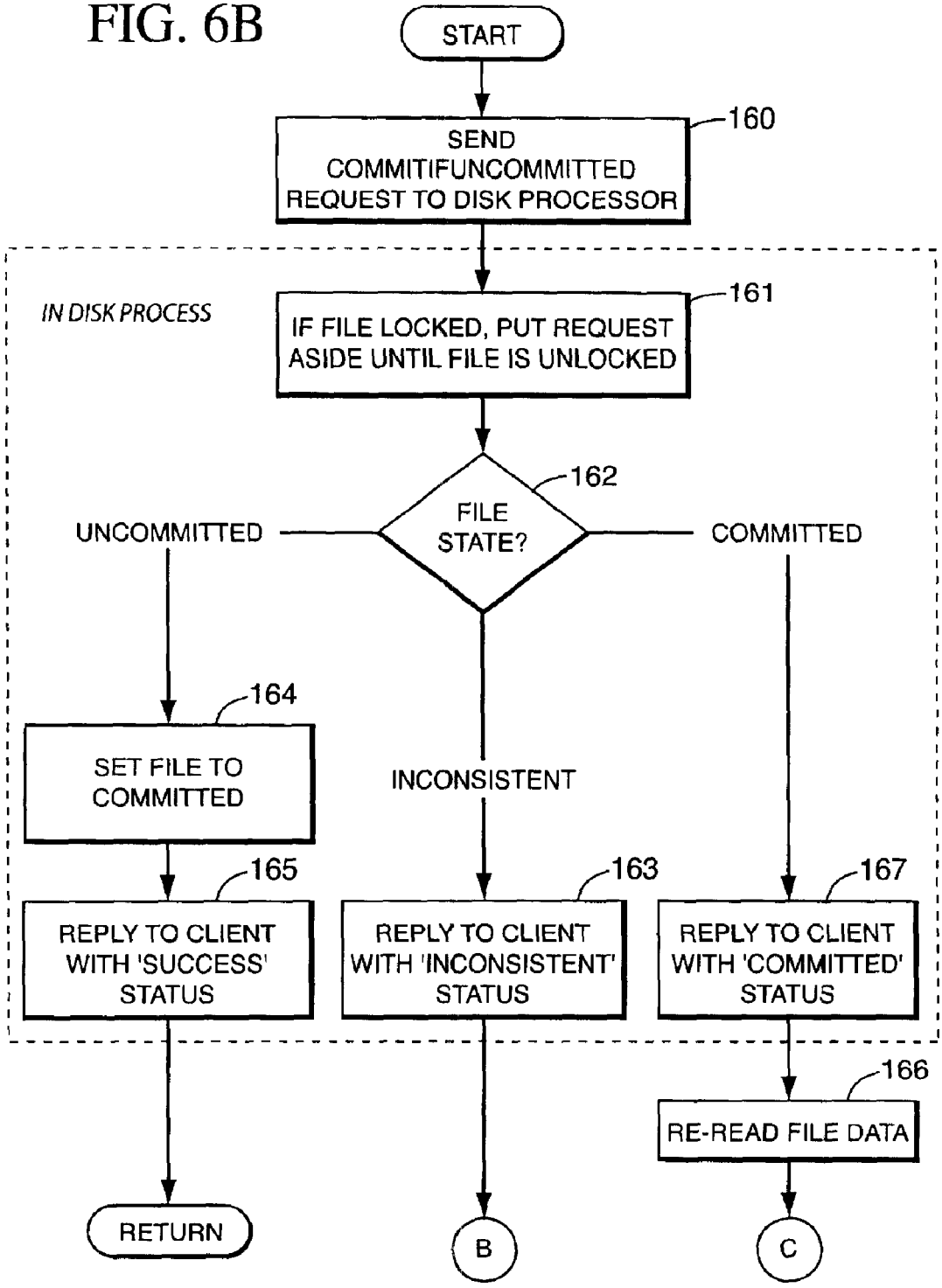
FIG. 6B shows a flow chart of the CommitIfUncommitted operation of the present invention.

FIG. 6B shows a flow chart of the CommitIfUncommitted operation of the present invention, which, again, takes into account any changes that may have occurred to the state value of the file object after the initial state determination in FIG. 5. FIG. 6B details step 128 of FIG. 5.

In step 160, the specific client process sends a CommitIfUncommitted Request to the disk process. In the disk process at step 161, if the file is locked, the request stays pending until the file is unlocked. The disk process then ascertains, in step 162, the current state value of the file object, which can be any one of the three states.

If the state value of the file object is 'uncommitted,' the state value is set to 'committed' in step 164, and the disk process sends a reply back to the specific client process indicating success, in step 165. The return path in FIG. 6B completes the normal exit from step 128 of FIG. 5.

If the state value of the file object is 'inconsistent,' the disk process sends a reply back to the specific client process so indicating, in step 163, and the flow continues at B in FIG. 5, at which a LockUnlessCommitted operation is performed. Because the state value of the file object is 'inconsistent', the specific client process must re-adjust the file contents before the file object can be committed.

If the state of the file object is 'committed,' the disk process sends a reply back to the specific client process so indicating, in step 162, and this prompts the client process to re-read the contents of the file object in step 166. The process continues at C in FIG. 5, at which the client process determines, in step 124, whether the content is suitable for that process. If so, the specific client process shares the committed file object. If not, the flow ends with a failure indication.

Figure 6C:
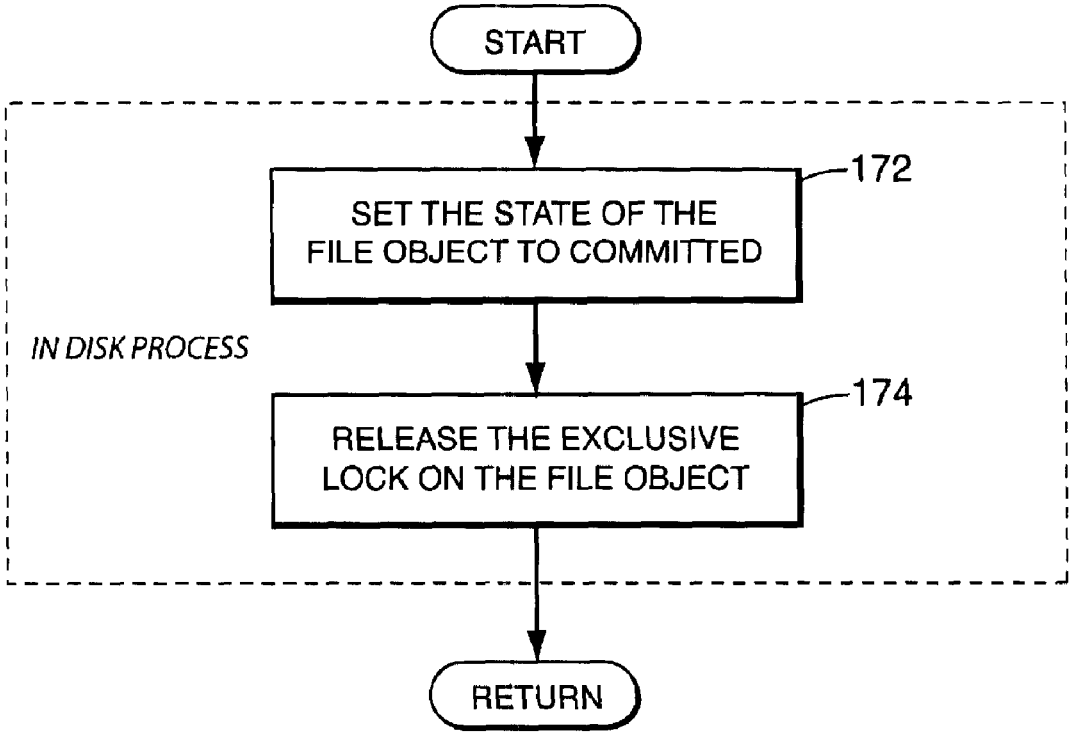
FIG. 6C shows a flow chart of the CommitAndUnlock operation of the present invention.

FIG. 6C shows a flow chart of the CommitAndUnlock operation of the present invention, expanding step 136 of FIG. 5. This operation does not need to check the state value of the file object again because the operation only occurs when the file object is locked, which precludes its state from being changed. The operation begins with the disk process setting the state of the file object to committed in step 172 and then releasing the lock in step 174.

Figure 6D:
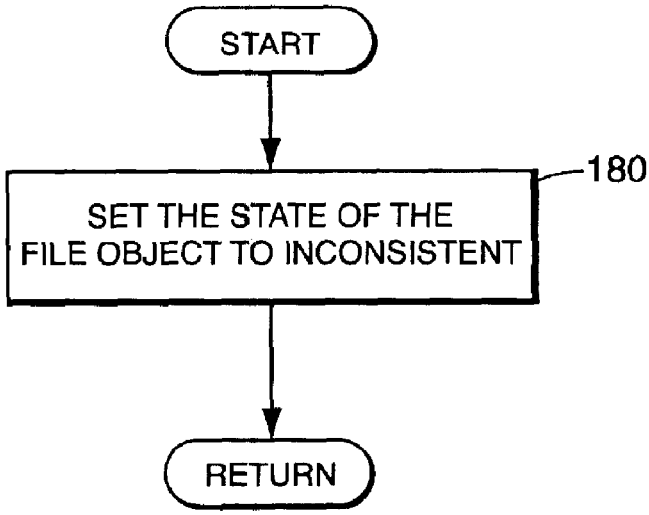
FIG. 6D shows a flow chart of the SetInconsistent operation of the present invention.

FIG. 6D shows a flow chart of the SetInconsistent operation of the present invention. This operation simply sets the state value of the file object to 'inconsistent', in step 180, and returns.

The protocol of the present invention requires the following conventions. First, while the state value of a file object is 'committed', it cannot be changed. Second, the contents of a file object can only be changed when it is locked. Third, while the state value of a file object is 'uncommitted', the contents of the file object are not altered. These conventions allow the sharing of the file object by multiple processes without a lock to determine whether the contents of the file object are suitable for use without adjustment. This sharing, in turn, permits a greater degree of concurrency among the processes competing for the file object and cuts down on message traffic because a lock is not required to determine the suitability of a file object for a specific client process.

Figure 7:
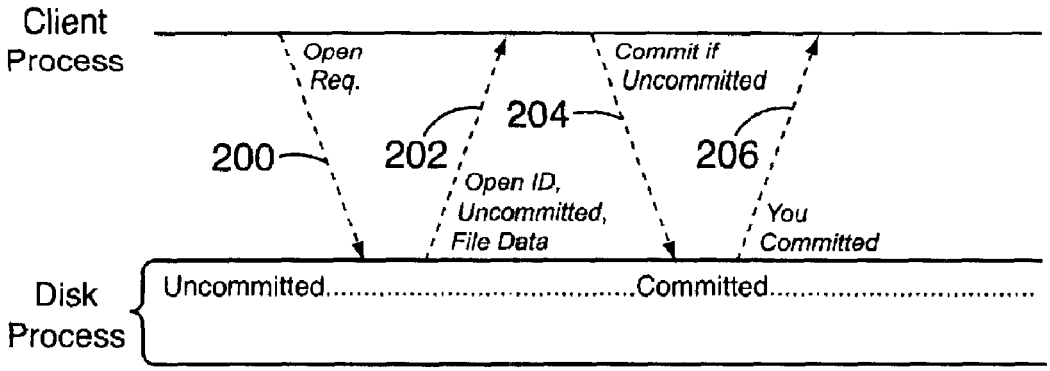
FIG. 7 shows a scheduling diagram of the synchronization protocol of the present invention when no modification is needed.

FIG. 7 shows a scheduling diagram of the synchronization protocol of the present invention when no modification is needed. This diagram depicts the order of events for the path of FIG. 5 in which the CommitIfUncommitted operation successfully returns because the state value of the file object is remains 'uncommitted'. See FIG. 6B. The first event is a request 200 by the specific client process to open the file and read the attributes and contents. Upon receipt of the request, the disk process returns 202 the Open ID, the state value ('uncommitted', in this case) and the requested file object contents. The specific client process then, after reviewing the information returned, sends a CommitIfUncommitted message 204 to the disk process which then responds with an acknowledgement 206 that the file is committed.

Figure 8:
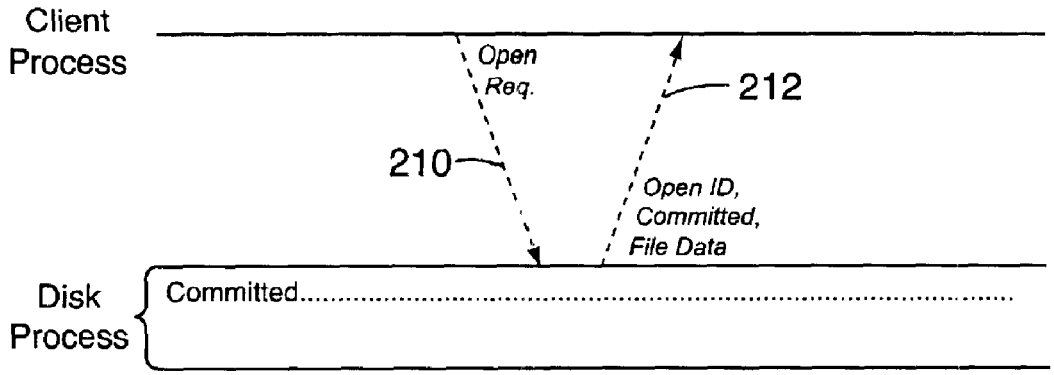
FIG. 8 shows a scheduling diagram of the synchronization protocol of the present invention in which no modification is needed and file is committed.

FIG. 8 shows a scheduling diagram of the synchronization protocol of the present invention in which no modification is needed and the state value of the file object is 'committed'. This diagram shows the order of events for the path of FIG. 6B in which the state value of the file object is 'committed'. The first event, again, is an open request, in step 210, from the client process. Again, the disk process returns the Open ID, the state value ('committed', in this case) and the requested file contents in step 212. If the contents of the file object are correctly adjusted for the client process, then there is a success indication; otherwise a failure is indicated.

Figure 9:
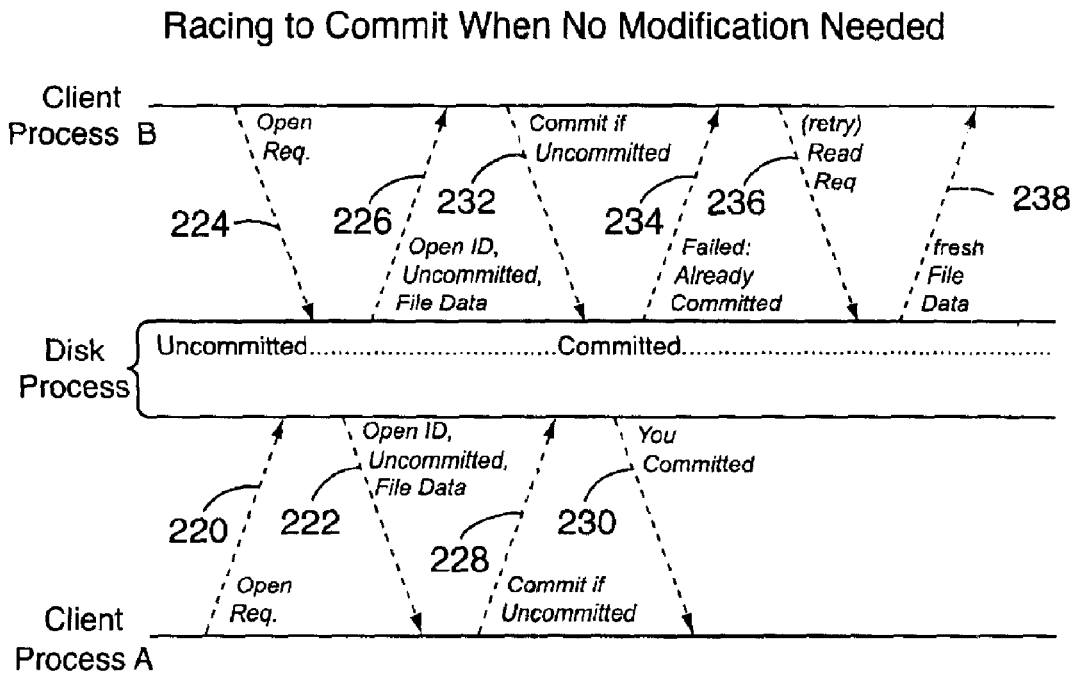
FIG. 9 shows a scheduling diagram of the synchronization protocol of the present invention in which there is a race to commit when no modification is needed.

FIG. 9 shows a scheduling diagram of the synchronization protocol of the present invention in which there is a race to commit when no modification is needed. In this diagram there are two client processes, A and B, that race to change the state value of the file object to 'commit'. The events include two clients performing a CommitIfUncommitted operation. The disk process, on behalf of one of the clients (client A in the diagram), determines that the state value of the file object is 'uncommitted', performs the commit and sends a reply to the specific client process (client A) that the state value of the file object is 'committed'. The other of the clients (client B) discovers that the state value of the file object is 'committed'. This other client then re-reads the contents of the file object to determine whether the file object is suitable for use by that client process.

The race occurs as follows. In FIG. 9, client process A makes an open request of the disk process in step 220 and the disk process returns the Open ID, the state value of the file object ('uncommitted') and the requested file contents in step 222. Shortly after client process A makes its open request, client process B makes its open request in step 224 and the disk process return to it the Open ID, the state value of the file object ('uncommitted') and the requested file contents in step 226. Now, there are two processes that have read the file object and both decide that the file object is properly adjusted for use (no adjustment is needed). This state of affairs causes a race to commit the uncommitted file object, but only one client process can win the race. In FIG. 9, client process A wins the race because its CommitIfUncommitted message in step 228 is delivered slightly earlier than the similar request from client process B. In step 230, client A receives a reply that it was successful in its attempt to set the state value of the file object to 'committed'. The contents are now suitable for client A. When client process B sends its CommitIfUncommitted message to the disk process, in step 232, the disk process responds with a message saying the state of the file object has already been changed to 'committed', in step 234. See FIG. 6B. This response causes client process B to make a request to re-read the file contents, in step 236, which are then returned by the disk process in step 238. Because the contents of the file object are still properly adjusted, client process B can share the file.

In an alternative version of the invention, the disk process tracks, for each client, whether the contents of the file object have been written or adjusted after a client process opened the file object, and if not, then replies, in step 234 of FIG. 9, with an indication that the state value of the file is 'committed' and the file object contents are unchanged. This alternative permits steps 236 and 238 to be omitted.

Figure 10:
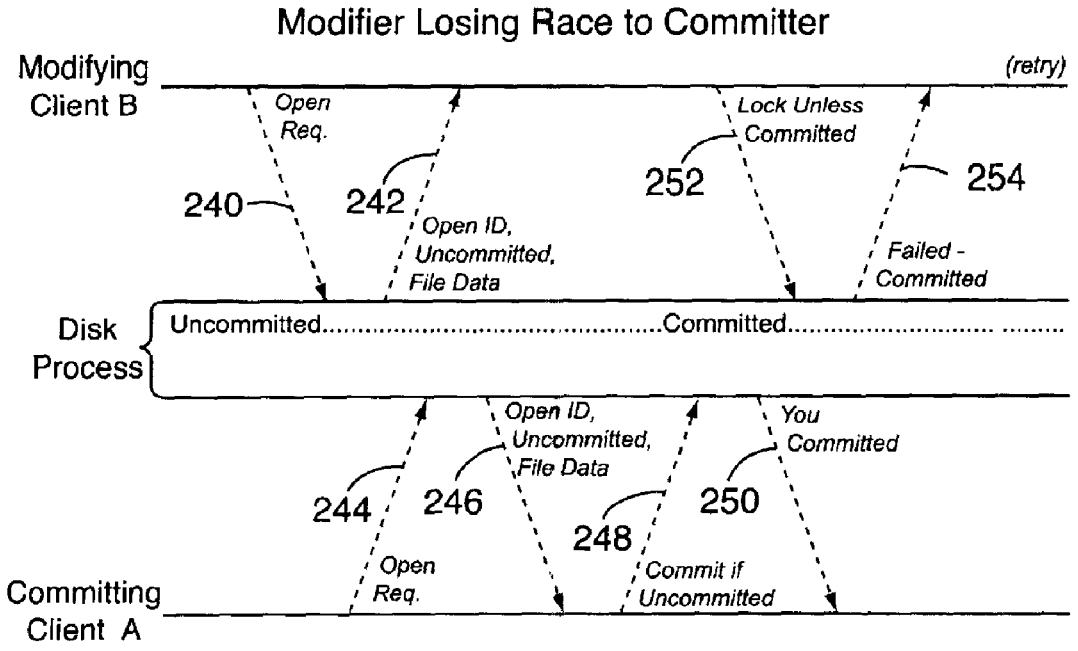
FIG. 10 shows a scheduling diagram of the synchronization protocol of the present invention in which there is a race between a modifying client and a committing client and the modifying client loses.

FIG. 10 shows a scheduling diagram of the synchronization protocol of the present invention in which there is a race between a "modifying client" (client B) and a "committing client" (client A) and the "modifying client" loses. The "committing client" traverses through a path in FIG. 6B in which the CommitIfUncommitted operation returns a reply that the state value of the file object is 'committed'. The modifying client traverses through the path in FIG. 6A in which the LockUnlessCommitted operation discovers that the state value of the file object has changed to 'committed', which prompts the "modifying client" to re-read of the file object's contents.

The first event in FIG. 10 is client B's request to open the file object in step 240 and obtain, in response, the OpenID, state value of the file object ('uncommitted') and the requested file object contents in step 242. Next, client A makes an open request in step 244 and, in response, receives the same contents in step 246. Client A can use the file object contents with its current configuration but client B cannot; client B must modify the file to make it suitable for its use. Thus, client A and client B are in a race. Client A is racing to perform a commit operation on the file object, but client B is racing to lock the file object so that it can adjust the contents of the file object. In the diagram of FIG. 10, client A wins the race. Client A's CommitIfUncommitted operation in step 248 receives a reply that the state value of the file object is 'committed', in step 250. See FIG. 6B. When client B eventually performs the LockUnlessCommitted operation in step 252, client B receives a reply that the state value of the file object is 'committed', in step 254. See FIG. 6A. The latter message causes client B to request a re-read of the file contents to re-assess whether it can use the contents of the file object.

Figure 11:
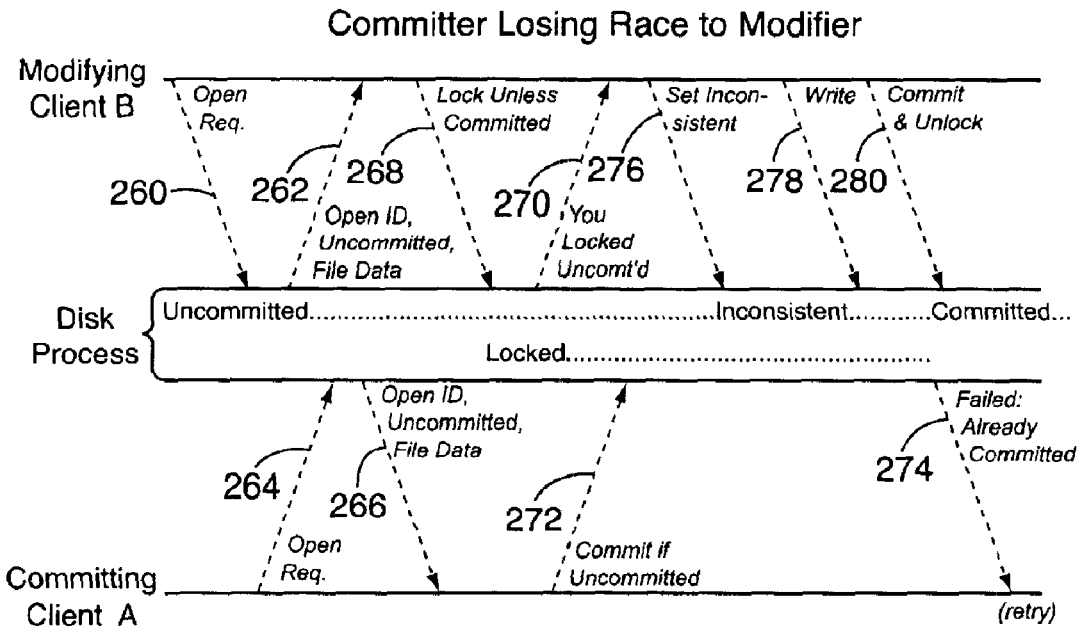
FIG. 11 shows a scheduling diagram of the synchronization protocol of the present invention in which there is a race between a modifying client and a committing client and the committing client loses.

FIG. 11 shows a scheduling diagram of the synchronization protocol of the present invention in which there is a race between a "modifying client" (client B) and a "committing client" (client A) and the "committing client" loses. In this case, the client A traverses through the path of FIG. 6B in which a CommitIfUncommitted operation receives an reply that the state value of the file object is 'committed', triggering a re-read of the contents of the file object by client A. Client B traverses through the path in FIG. 6A in which the state value is 'uncommitted' and a LockUnlessCommitted operation receives a reply that the lock on the file object is granted to client B. Client B proceeds, according to FIG. 5, to perform a SetInconsistent operation, to adjust the file object and to perform a CommitAndUnlock operation.

The first event in FIG. 11 is the open request by client B in step 260 which causes the disk process to return, in response to the open request, the Open ID, the state value of the file object ('uncommitted') and the requested file contents in step 262. Shortly thereafter, client A makes an open request in step 264 and receives, in response, the same contents in step 266. There is now a race between client A and client B. Client A needs to perform a commit because the file object contents (as a given) are in the correct configuration for client A. Client B needs to perform a lock on the file object to adjust the file object's contents. In this diagram, client B wins the race and performs a LockUnlessCommitted operation in step 268, for which a successful reply is sent to client B in step 270.

Meanwhile, client A requests a CommitIfUncommitted operation in step 272, and waits for the reply. The request is held by the disk process because of the lock obtained by client B on the file object, which delays the state value of the file object from being available to other client processes.

As mentioned above, client B performed a LockUnlessCommitted operation in step 268. The disk process replied with a grant of the lock in step 270 and client B then responded with a SetInconsistent message in step 276 back to the disk process. At this point client B has exclusive ownership of the file object and is free to adjust the contents of the file object, in step 278, to meet its operating conditions. Following adjustments to the file object's contents, client B performs a CommitAndUnlock operation in step 280. Once the file object is unlocked by client B, the disk process replies to the waiting client process A in step 274. Only then does client A discover that the state value of the file object is 'committed'. This causes client process A to request a re-read of the contents of the file object to determine if the altered file object is suitable for its use.

Figure 12:
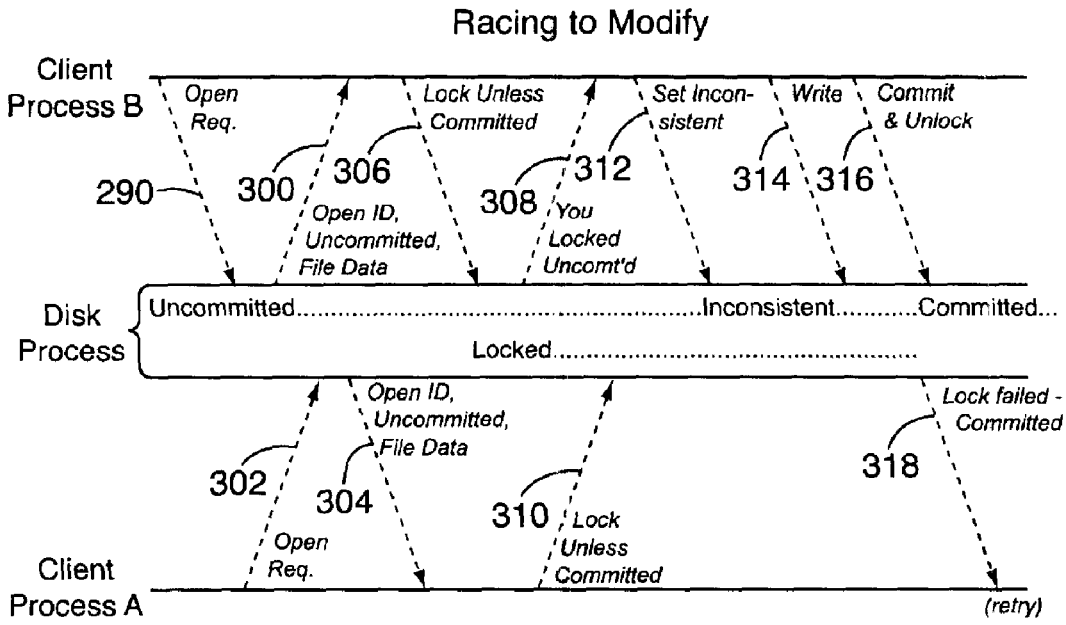
FIG. 12 shows a scheduling diagram of the synchronization protocol of the present invention in which there is a race between two modifying clients.

FIG. 12 shows a scheduling diagram of the synchronization protocol of the present invention in which there is a race between two modifying clients, client process A and B. Client's A and B are both attempting to obtain a successful lock on the file object by means of a LockUnlessCommitted operation and Client B in the figure is the winner.

The first event is, as usual, an open request in step 290 by client B. The disk process replies in step 300 with the Open ID, the state value of the file object ('uncommitted') and the requested file object contents. The second event is an open request from client process A in step 302 which returns the same information in step 304. Now, because both processes need to alter the contents of the file object, there is a race to lock the file object by performing a LockUnlessCommitted operation. In the figure, client process B performs the LockUnlessCommitted operation, in step 306, and the disk process responds by replying that the lock is granted to client B in step 308. Client A then performs a LockUnlessCommitted operation in step 310 but does not receive an immediate response. The delay in receiving the response occurs because the file object is locked and undergoing an adjustment by client B. After Client B performs a SetInconsistent operation in step 312 and adjusts the file object contents in step 314, client B then performs a CommitAndUnlock operation in step 316. The unlocked condition of the file object causes client A to discover that the state value of the file object is 'committed', in step 318 and to request a re-read to determine whether the changed file is now suitable for use of the file in client A's environment. If so, client A can share the file.

Figure 13:
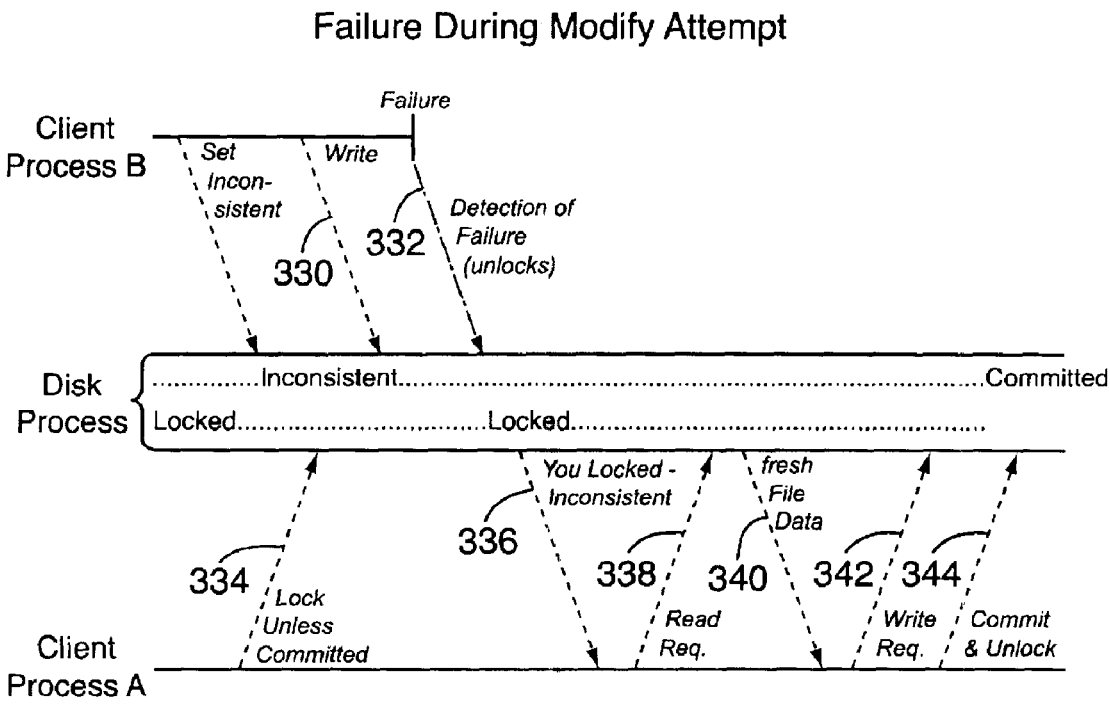
FIG. 13 shows a scheduling diagram of the synchronization protocol of the present invention in which there is a failure during a modifying attempt.

FIG. 13 shows a scheduling diagram of the synchronization protocol of the present invention in which there is a failure during a modifying attempt. In this diagram, client A needs to obtain a lock to modify the contents of the file object and client process B has already obtained a lock and is modifying the file object contents in step 330 when a failure in client process B occurs in step 332. Client process A has performed a LockUnlessCommitted operation in step 334, but has not received a reply from the disk process because the file object is locked. Normally, client process B would complete its updates and then unlock and commit the file. However, as stated above, a failure in client process B occurs in step 332. This causes the disk process to unlock the file object in step 332 leaving the contents of the file object in a possibly partially changed state, as reflected by the state value of 'inconsistent'. Upon the unlocking of the file object, the disk process responds to client process A's pending LockUnlessCommitted message by granting a lock while the state value of the file object is 'inconsistent', in step 336. See FIG. 6A. According to the flow chart of FIG. 6A, client process A must now re-read the file object contents, in step 338, to determine its suitability following step 340. The process adjusts the contents of the file object in step 342 and then, continuing at A in FIG. 5, performs a CommitAndUnlock operation, in step 344, to commit the file object. Thus, the state value of 'inconsistent' facilitates the discovery of such a failure event and its proper handling.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method for sharing among a plurality of competing processes a file object that includes file contents and a state that describes whether the file contents are inconsistent and whether the file object is in the use of a competing process, the state having a value being selected from a group consisting of 'uncommitted', 'inconsistent' and 'committed', the method comprising:

determining the state value of the file object and whether or not the file content is suitable for use by a specific one of the competing processes;

(i) if the state value of the file object is not 'committed' and either the state value is 'inconsistent' or the file content is not suitable for use by the specific one of the competing processes:

obtaining exclusive access to the file object;

adjusting the contents of the file object;

setting the state of the file object to 'committed'; and relinquishing exclusive access to the file object;

(ii) if the state value of the file object is not 'committed' and the state value is not 'inconsistent' and the file content is suitable for use by the specific one of the competing processes, setting the state of the file object to 'committed';

(iii) if the state value of the file object is 'committed' and the file content is suitable for use by the specific process, sharing the committed file; and (iv) otherwise, returning a failure status.

2. A method as recited in claim 1, further comprising the steps of:

setting the state value of the file object to 'inconsistent' after obtaining exclusive access to the file object; and if the specific process fails while having exclusive access to the file object, relinquishing exclusive access to the file object to leave the state value of the file object as 'inconsistent'.

3. A method for sharing among a plurality of competing processes a file object that includes file contents and a state that describes whether the file contents are inconsistent and whether the file object is in the use of a competing process, the state having a value being selected from a group consisting of 'uncommitted', 'inconsistent' and 'committed', the method comprising:

(a) opening and reading the file object to determine the state value of the file object and whether or not the contents of the file object are suitable for use by a specific one of the competing processes;

(i) if the state value of the file object is not 'committed' and either the state value is 'inconsistent' or the file content is not suitable for use by the specific one of the competing processes:

(b) performing a LockUnlessCommitted operation;

(c) upon receiving a lock on the file, performing a SetInconsistent operation;

(d) adjusting the contents of the file object;

(e) performing a CommitAndUnlock operation to commit and unlock the file object; and (f) returning a success indication;

(ii) if the state value of the file object is not 'committed' and the state value is not 'inconsistent' and the file content is suitable for use by the specific one of the competing processes':

(g) performing a CommitIfUncommitted operation on the file object to commit the file object; and (h) upon receiving an indication that the file object is 'committed', returning a success indication; and (iii) if the state value of the file object is 'committed':

(j) if the content is suitable, sharing the committed file; and (k) if the content is not suitable, returning a failure indication.

4. A method as recited in claim 3, wherein the step of performing a LockUnlessCommitted operation includes:

(n) requesting a lock on the file object;

(m) ascertaining the state value of the file object;

(iv) if the state value of the file object is 'uncommitted':

(o) locking the file object; and (p) replying to the specific one of the client processes that the state value of the file object is 'uncommitted';

(v) if the state value of the file object is 'inconsistent':

(q) locking the file object;

(r) replying to the specific one of the client processes that the state value of the file object is 'inconsistent';

(s) re-reading the contents of the file object; and (t) continuing at step (d); and (vi) if the state value of the file object is 'committed':

(u) replying to the specific one of the client processes that the state value of the file object is 'inconsistent';

(w) re-reading the contents of the file object;

(x) if the contents are suitable, sharing the file object and returning a success indication; and (y) if the contents are not suitable, returning a failure indication.

5. A method as recited in claim 4, wherein the step (m) of ascertaining the state value of the file object includes the steps of:

determining whether the file object is locked;

if the file object is locked, waiting until the file object is unlocked; and if the file object is not locked, determining the state value of the file object.

6. A method as recited in claim 4, wherein step (n) is performed by the specific client process.

7. A method as recited in claim 4, wherein steps (m), (o), (p), (q), (r), and (u) are each performed by a disk process.

8. A method as recited in claim 4, wherein steps (s) and (w) are each performed by the specific client process.

9. A method as recited in claim 3, wherein the step of performing a CommitIfUncommited operation on the file object includes the steps of:

(n) requesting to change the state value of the file to 'committed';

(m) ascertaining the state value of the file object;

(iv) if the state value of the file object is 'uncommitted':

(o) setting the state value of the file to 'committed'; and (p) replying to the specific one of the client processes with a success status;

(v) if the state value of the file object is 'committed':

(q) replying to the specific one of the client processes that the state value of the file object is 'committed';

(r) re-reading the contents of the file object; and (s) continuing at step (j); and (vi) if the state value of the file object is 'inconsistent':

(t) replying to the specific one of the client processes that the state value of the file object is 'inconsistent'; and (u) continuing at step (b).

10. A method as recited in claim 9, wherein step (n) is performed by the specific client process.

11. A method as recited in claim 9, wherein steps (m), (o), (p), (q), and (t) are each performed by a disk process.

12. A method as recited in claim 9, wherein step (r) is performed by a disk process.

13. A method as recited in claim 9, wherein the step (m) of ascertaining the state value of the file object includes the steps of:

determining whether the file object is locked;

if the file object is locked, waiting until the file object is unlocked; and if the file object is not locked, determining the state value of the file object.

14. A method as recited in claim 3, wherein the step of performing a CommitAndUnlock operation includes:

(n) setting the state value of the file object to 'committed'; and (m) releasing the lock on the file object.

15. A method as recited in claim 3, wherein the step of performing a SetInconsistent operation includes the step of (n) setting the state value of the file object to 'inconsistent'.

*16. A processing system, comprising:*

*a processor; and*

*an I/O subsystem coupled to the processor and adapted to couple to another system on which an object is stored, the object having an associated state and data contents;*

*wherein the processor retrieves the object through the I/O subsystem, examines the object without using a lock and determines the state of the object;*

*wherein, if the processor determines the state to be a first state in which the data contents have been accepted for use and are suitable for the processing system, the processor returns a success indicator; or*

*wherein, if the processor determines the state not to be the first state nor a second state indicative of the data contents being modified, and determines the contents to be suitable for the processing system, the processor requests the system on which the object is stored to transition the state of the object to the first state.*

*17. The processing system of claim 16 wherein, if the processor determines the state to be the first state, but that the data contents are not suitable for the processing system, the processor returns a failure indicator.*

*18. The processing system of claim 16 wherein, if the processor determines the state not to be the first state and determines either that the data contents are not suitable for the processing system or that the state is not the second state, the processor requests the system on which the object is stored to lock the object, changes the data contents and requests the object to be unlocked.*

*19. A system, comprising:*

*a processor; and*

*an I/O subsystem coupled to the processor and adapted to couple to another system on which an object is stored, the object having an associated state and data contents;*

*wherein the processor retrieves the object through the I/O subsystem, reads the object without using a lock and determines the state of the object; and*

*wherein, if the processor determines the object is already in use by another system, the processor determines whether the data contents are suitable for use; and*

*if the processor determines that the object is not already in use by another system and determines that the data contents are suitable for use and not being modified, the processor requests the object to be committed to indicate that the processing system has accepted the object; or*

*if the processor determines that the object is not being used by another system and that the data contents are not suitable for use, the processor requests the object to be locked and then modifies the object's data contents.*

*20. The system of claim 19 wherein, if the processor determines the object is already in use by another system and determines that the data contents are suitable for use, the processor returns a success indication.*

*21. The system of claim 19 wherein, if the processor determines the object is already in use by another system and determines that the data contents are not suitable for use, the processor returns a failure indication.*

*22. A processing system, comprising:*

*means for retrieving a file object having a configurable state and data contents;*

*means for reading the file object without locking the file object;*

*means for determining whether the file object is in use by another processing system;*

*means for determining whether the data contents are suitable for use by the processing system if the object is already in use by another processing system; and*

*means for committing the file object if the file object is not already in use by another processing system and if the data contents are suitable.*

*23. The processing system of claim 22 further comprising means for requesting the object to be locked and for modifying the data contents if the file object is not being used by another processing system and the data contents are not suitable.*

* * * * *

UNITED STATES PATENT AND TRADEMARK OFFICE

CERTIFICATE OF CORRECTION

PATENT NO. : RE42,578 E
APPLICATION NO. : 10/788046
DATED : July 26, 2011
INVENTOR(S) : Darrell F. High et al.

It is certified that error appears in the above-identified patent and that said Letters Patent is hereby corrected as shown below:

In column 11, line 37, in Claim 3, delete "processes'" and insert -- processes --, therefor.

In column 12, line 16, in Claim 9, delete "CommitIfUncommited" and insert -- CommitIfUncommitted --, therefor.

Signed and Sealed this
First Day of May, 2012

David J. Kappos

David J. Kappos
*Director of the United States Patent and Trademark Office*